(12) United States Patent
Stangier et al.

(10) Patent No.: US 6,979,130 B1
(45) Date of Patent: Dec. 27, 2005

(54) BEARING DEVICE

(75) Inventors: Theodor Stangier, Morsbach (DE); Rudiger Dalchow, Gummersbach (DE)

(73) Assignee: Montaplast GmbH, Morsbach (DE)

( * ) Notice: Subject to any disclaimer, the term of this patent is extended or adjusted under 35 U.S.C. 154(b) by 0 days.

(21) Appl. No.: 10/088,239

(22) PCT Filed: Sep. 15, 2000

(86) PCT No.: PCT/DE00/03222

§ 371 (c)(1),
(2), (4) Date: Mar. 18, 2002

(87) PCT Pub. No.: WO01/20180

PCT Pub. Date: Mar. 22, 2001

(30) Foreign Application Priority Data

Sep. 16, 1999 (DE) .......................... 299 16 333 U

(51) Int. Cl.[7] .......................... F16C 27/00; F01L 1/00
(52) U.S. Cl. ........................... 384/416; 123/184.53
(58) Field of Search ...................... 384/416, 428, 384/438, 439, 440, 441; 123/184.55, 184.61, 123/184.53

(56) References Cited

U.S. PATENT DOCUMENTS

| 3,622,136 | A | * | 11/1971 | Zenkner | 432/199 |
|---|---|---|---|---|---|
| 3,972,314 | A | | 8/1976 | Dupont et al. | 123/139 |
| 4,274,368 | A | | 6/1981 | Shaffer | 123/52 |
| 4,413,598 | A | | 11/1983 | Tsutsumi | 123/306 |
| 4,794,886 | A | * | 1/1989 | Iwamuro et al. | 123/184.49 |
| 4,795,420 | A | * | 1/1989 | Sakurai et al. | 60/313 |
| 4,858,567 | A | | 8/1989 | Knapp | 123/52 |
| 5,651,339 | A | * | 7/1997 | Weining et al. | 123/184.53 |
| 5,667,311 | A | * | 9/1997 | Maers | 384/441 |
| 5,713,323 | A | * | 2/1998 | Walsh et al. | 123/184.42 |
| 5,813,380 | A | * | 9/1998 | Takahashi et al. | 123/184.55 |
| 5,875,758 | A | * | 3/1999 | Fujita | 123/336 |
| 6,279,528 | B1 | * | 8/2001 | Happenhofer et al. | 123/184.53 |

FOREIGN PATENT DOCUMENTS

| DE | 2035939 | 2/1972 | F02F 1/42 |
|---|---|---|---|
| DE | 3039774 | 5/1982 | F02B 31/00 |
| DE | 3522991 | 1/1987 | F02B 31/00 |
| DE | 3833846 | 4/1989 | F02B 31/00 |
| GB | 2338266 | 12/1999 | F02B 31/06 |
| JP | 57062927 | 4/1982 | F02B 31/00 |
| JP | 7293258 | 11/1995 | F02B 31/00 |
| JP | 8128328 | 5/1996 | F02B 31/00 |

* cited by examiner

Primary Examiner—Thomas R. Hannon
(74) Attorney, Agent, or Firm—Grossman, Tucker, Perreault & Pfleger, PLLC

(57) ABSTRACT

The aim of the invention is to improve a bearing device for rotatably receiving a control element (2) in lines which guide mediums and pertain to a combustion engine with bearing receptacles (10, 11), in such a way that the assembly thereof is simplified. The bearing receptacles rotatably receive the control element and can be fixed in the lines. To resolve the aim of the invention, the bearing receptacles are connected by means of an at least partially elastic connecting element (14) in such a way that said receptacles form a bearing unit (1). The bearing receptacles, together with the connecting element and the inserted flap, are inserted in a receptacle which is provided in the induction pipe.

8 Claims, 3 Drawing Sheets

BEARING DEVICE

The invention concerns a bearing device for rotatably receiving a control element in media-carrying conduits of an internal combustion engine with bearing receiving means which rotatably receive the control element and can be fixed in the conduits.

Preferably the control elements are in the form of a turbulence flap, a length switching flap or the like and the media-carrying conduits can be for example in the form of an induction system for vehicles.

The flaps have stub-like projections which extend substantially in the direction of their longitudinal extent and which are rotatably supported in the bearing receiving means. The stub-like projections, the flap and the bearing receiving means also have a steel shaft passing therethrough, the steel shaft being non-rotatably connected to the flap. The shaft is rotated by way of a setting unit which is preferably in the form of a stepping motor, thereby changing the setting angle of the flaps connected to the shaft. The setting angle of the plate members is adjusted as desired by way of the positioning of the stepping motor. The mode of operation and the areas of use of turbulence flaps in induction systems are well-known to the man skilled in the art.

The stub-like projections on the flaps are not absolutely necessary; it is also possible for the bearing receiving means to rotatably receive shafts on which the flaps are non-rotatably arranged. The advantage of a steel shaft is that it can be supported in such a way as to be displaceable, whereby jamming of the flaps is prevented in the event of the steel shaft expanding due to the effect of heat.

For fitting each individual flap in the induction pipe, in the state of the art at least three components are required, which have to be assembled together, namely the flap with two respective bearing receiving means which have to be fitted on to the stub-like projections and which are frequently referred to as 'bearing blocks'. Those bearing receiving means comprise substantially plate-like plastic elements with a through bore which operates as a bearing. The bearing receiving means in turn have to be fitted in the assembly position in receiving means of the induction pipe. That fitting operation can involve problems in constricted engine compartments. Moreover, the fixing arrangement in accordance with the state of the art requires a relatively large amount of space as the bearing blocks must be of a certain minimum width in order to prevent unwanted tilting.

Therefore the technical object of the present invention is to further develop a bearing of the general kind set forth, in such a way that the installation thereof is simplified.

In accordance with the invention that object is attained in that the bearing receiving means can be connected by way of at least partially elastic connecting element to form a bearing unit and together with the connecting element and the inserted flap can be fitted into a receiving means provided in the induction pipe. By virtue of that configuration the bearing unit can be pre-assembled externally so that, upon assembly of the engine, the bearing unit only has to be fitted into a receiving means provided for same on the induction pipe. The procedure involved in inserting and accurately adjusting the bearings is eliminated as the bearings are held in the reference position by the connecting element. The elastic nature of the connecting element permits deformation of the bearing unit for fitting the otherwise rigid flap into the bearing openings of the bearings.

The substantial advantages of the invention lie in the capability of pre-assembly and the fact that the bearing unit can be of any desired configuration, thereby affording a great deal of freedom in terms of design from the point of view of plastic engineering.

Preferably the bearing receiving means and the connecting element are formed in one piece in a bush-like manner. That bush, that is to say the connecting element and the two bearings, with the receiving openings provided therein, are preferably injection molded in the form of a one-piece plastic component. The use of glass fiber-reinforced polyamides has proven to be particularly desirable as they are both temperature-resistant and also resistant to the media which occur in the engine.

In the assembly procedure the bearing unit is bent open and the flap inserted. After the flap has been placed in the bearing receiving means, the bearing unit contracts again to assume its original configuration.

It has proven to be particularly desirable for the bush to be substantially in the form of a C-shaped profile which can be bent open at the separation plane. For simplifying assembly and accurate fixing of the bearing unit in the induction pipe, it is also advantageous for the induction pipe to be provided with a guide bar which engages into the bearing unit in the position of installation, in order to adjust it.

Finally, the bearing unit can be provided with an edge which is the upper edge in the position of installation and which serves as a sealing edge for further assemblies to be fixed on the induction pipe. In that way it is possible for example to eliminate additional sealing elements between the induction pipe and the cylinder head.

An embodiment of the invention is described in greater detail hereinafter with reference to the drawings in which.

Figure 1:
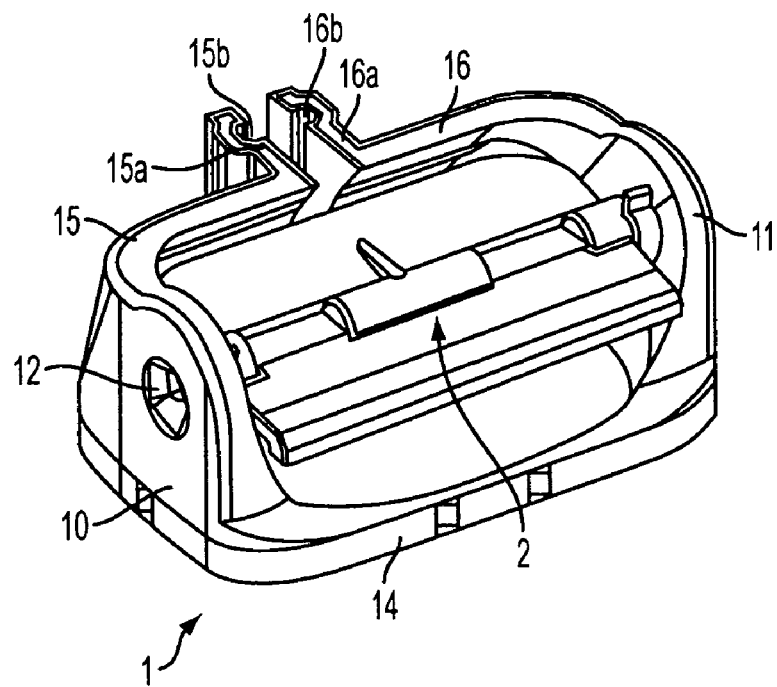
FIG. 1 shows a perspective view of the bearing unit with assembled flap.
Figure 2:
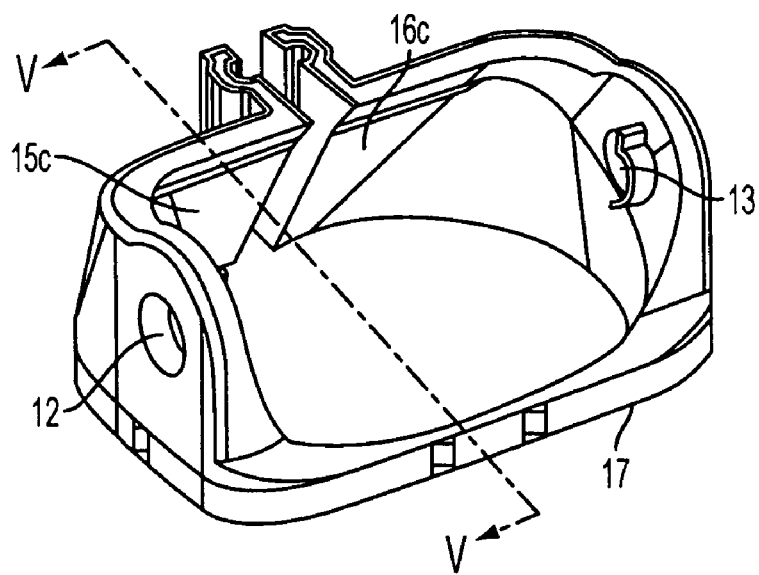
FIG. 2 shows a perspective view of the bearing unit without the inserted flap.
Figure 6:
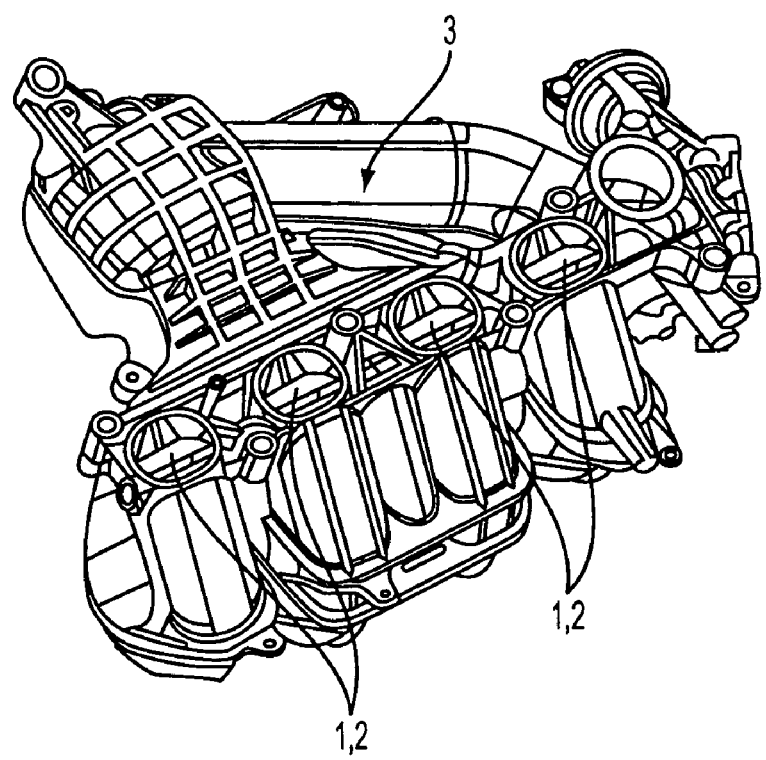
FIG. 6 shows a perspective view of a plurality of bearing units inserted into an induction manifold.

As can be seen in particular from FIGS. 1 and 2 the bearing unit comprises a substantially rectangular bush-shaped plastic body. A turbulence flap 2 which is equally made from plastic material is rotatably fitted into the bearing unit 1. In the Figures, the bearing unit 1 is shown turned through 180° relative to the position which it assumes in the situation of installation in the induction pipe 3 as shown in FIG. 6.

Alternatively the flap 2 can be made from metal in order to prevent particles of plastic material coming away from the flap in the event of misfires. In order to implement optimum frictional pairing as between the flap 2 and the bearing unit 1 the bearing journals or projections 22, 23 of the turbulence flap 2 have a suitable plastic material injection molded therearound. Making the flap from steel, in comparison with making it from plastic material, enjoys the advantages that it has better dimensional accuracy and a higher level of stability in relation to misfires. In addition the cross-section of the flaps can be thinner in comparison with the plastic form of flap, and that entails a reduction in the degree of encroachment of the flap in the cross-section in the pipe.

The bearing unit 1 has two substantially mutually parallel bearing receiving means 10 and 11 which form the side limbs of the bearing unit. The bearing receiving means 10 and 11 are each provided with respective holes 12 and 13 which are oriented in co-linear relationship with each other. The stub-like projections on the turbulence flap 2 are rotatably accommodated in those holes in the position of installation.

The bearing receiving means 10 and 11 are connected together by way of a connecting element 14 which is injection molded thereon in one piece. The connecting element forms the longitudinal limb and the bearing receiving means 10 and 11 form the transverse limbs of the bearing unit 1. The connecting element 14 can be partially twisted in order to be able to fit the turbulence flap into the bearing unit 1. After deformation the bearing unit 1 returns to its original rest position again. For the purposes of inserting a flap 2 the bearing receiving means 10 and 11 can be bent out of their rest position into an angled position.

Adjoining the bearing receiving means 10 and 11 are limbs 15 and 16 which once again extend at a right angle to the bearing receiving means 10 and 11. The limbs 15 and 16 thus extend substantially parallel to the connecting element 14 and are injection molded in one piece to the bearing receiving means 10 and 11.

Provided between the ends of the limbs 15 and 16, which project toward each other, is a separation plane or opening so that the free ends of the limbs 15 and 16 do not touch each other. Integrally molded to the free ends of the limbs 15 and 16 are fixing limbs 15a and 16a which extend at a right angle thereto. At the inward sides of the fixing limbs 15a and 16a, which face towards each other, also formed therein are guide grooves 15b and 16b into which engages a fixing bar which for example is provided on the induction pipe. That structure permits the bearing unit 1 to be accurately and simply fixed in the assembly for accommodating it. For the assembly procedure, the bearing unit 1 which is already provided with the turbulence flap 2 only has to be pushed on to the fixing bar.

Figure 3:
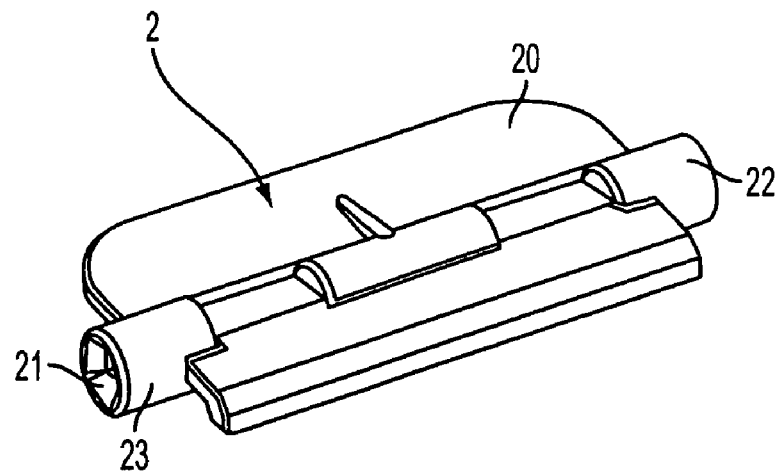
FIG. 3 shows a perspective view of the flap.

FIG. 3 shows a perspective view of the turbulence flap 2. The turbulence flap 2 accordingly comprises a substantially flat flap member 20 on which is provided approximately at the center thereof a passage 21 for a shaft, the passage 21 extending in the longitudinal direction in which the flap 2 extends. The passage 21 is of an internal quadrangular configuration into which the shaft which is also in the form of a quadrangular member engages and thus affords a non-rotatable connection to the turbulence flap 2. Provided in the longitudinal direction of the passage 22 on the turbulence flap 2 are bush-like projections 22 and 23, the outsides of which are of the contour of a cylinder and which project beyond the ends of the flap member 20. The turbulence flap 2 can be fixed by those projections 22 and 23 in the bearing receiving means 10 and 11 of the bearing unit; in the received condition, the projections 22 and 23 are supported rotatably and without play in the receiving means.

Figure 4:
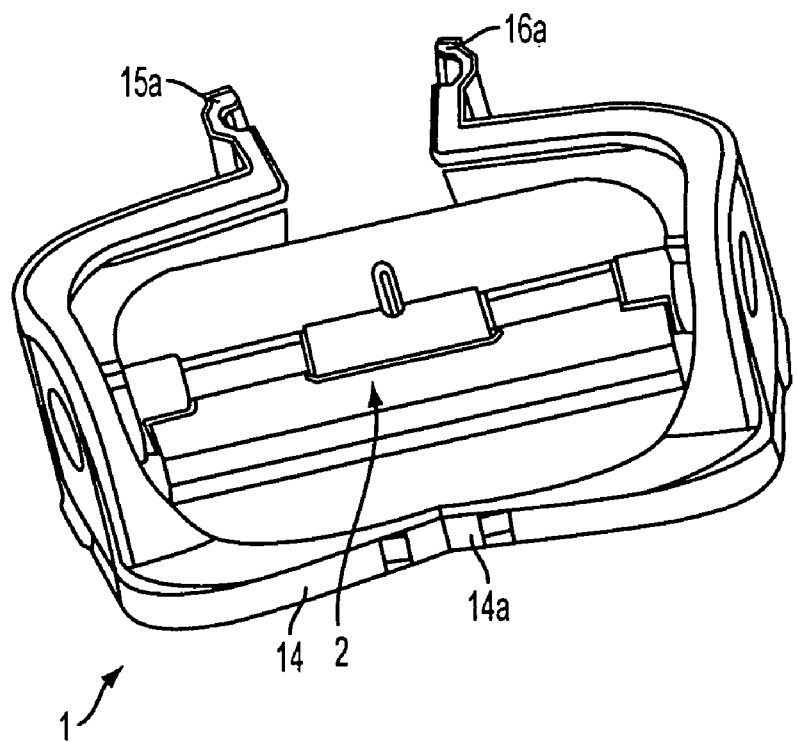
FIG. 4 shows a perspective view of the bearing unit during assembly of the flap.

The procedure involved in mounting the turbulence flap 2 in the bearing unit 1 is shown in FIG. 4. For the assembly operation, in the simplest variant the fixing limbs 15a and 16a are slightly bent away from each other, in which case the connecting element 14 is slightly bent at a bend location 14a which is disposed approximately centrally, until it is possible to fit the projections 22 and 23 into the bearing receiving means 10 and 11 of the bearing unit 1. When the fixing limbs 15a and 16a are released the bearing unit contracts again to assume its initial shape.

Figure 5:
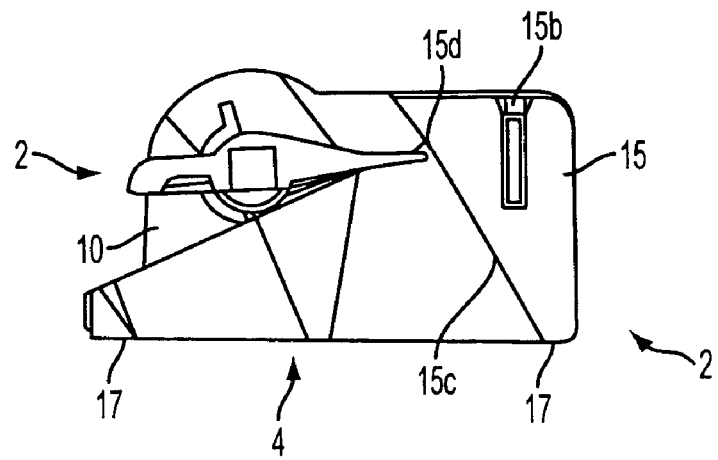
FIG. 5 shows a side view in section taken along line V—V in FIG. 2.

It can be seen from the sectional side view in FIG. 5 that the insides of the limbs 15 and 16, which are towards the turbulence flap 2, are in the form of flow walls 15c and 16c which extend inclinedly in relation to the direction of flow of the air 4 and which guide the air flowing thereto to the turbulence flap 2. The bearing unit 1 extends around the turbulence flap 2 over the entire periphery in the closed position of the flap 2.

Depending on the situation of use, employing different bearing units 1 with differently inclined flow walls 15c and 16c makes it possible to implement the flow properties required without having to replace the entire induction pipe 3. Instead, only the bearing unit 1 has to be replaced by a bearing unit which is of a suitably different configuration; the flow properties can thus be altered in a modular manner by the bearing unit 1. The bearing unit itself represents the internal geometry of the induction pipe 3.

The flow wall 15c is provided with a groove-shaped opening 15d which extends in the longitudinal direction and with which a previously established gap tolerance can be maintained in the closed position between the edge of the flap 2 and the bearing unit 1.

FIG. 6 shows a perspective view of an induction manifold 3 which is designed for a four-cylinder engine and into which are fitted four bearing units 1 provided with turbulence flaps 2. The bearing units 1 are fitted into openings suitably provided on the induction manifold 3, in a position of being turned through 180° relative to the orientations shown in FIGS. 1, 2, 4 and 5.

In the position of installation, the edges of the bearing units 1, which are the upper edges in the position of installation, serve as sealing edges 17 for assemblies which are connected to the induction pipe, thus for example a main flange of a cylinder head. By virtue of the bearing unit being of a configuration with a ridge-shaped sealing edge 17 integrally formed thereon and projecting outwardly, it is possible to omit additional sealing means between the induction pipe and the cylinder head, whereby assembly of the structural units is markedly simplified.

The embodiment by way of example of the invention has been described hereinbefore with reference to a turbulence flap; it will be apparent to the man skilled in the art that the control element does not have to be in the form of a flap. The control element can for example also be in the form of a roller.

| | |
|---|---|
| 1 | bearing unit |
| 2 | turbulence flap |
| 3 | induction pipe |
| 4 | air flow direction |
| 10 | bearing receiving means |
| 11 | bearing receiving means |
| 12 | hole |
| 13 | hole |
| 14 | connecting element |
| 14a | bending location |
| 15 | limb |
| 15a | fixing limb |
| 15b | guide groove |
| 15c | flow wall |
| 15d | opening |
| 16 | limb |
| 16a | fixing limb |
| 16b | guide groove |
| 17 | sealing edge |
| 20 | flap |
| 21 | receiving means |
| 22 | projection |
| 23 | projection |

What is claimed is:

1. A bearing device for rotatably receiving a control element in media-carrying conduits of an internal combustion engine comprising a bearing unit comprising a C-shaped profile which surrounds said control element and which can be bent open at a separation plane and first and second substantially mutually parallel bearing receiving means at a location removed from said separation plane and which are oriented in co-linear relationship with each other forming the traverse limbs of the bearing unit which receiving means are connected by an at least partially elastic connecting element, said control element comprising first and second bearing journals respectively received in said first and second bearing receiving means, whereby said control element is rotatably fitted into said bearing unit and wherein said bearing unit can be inserted into a receiving means in the conduits.

2. A bearing device as set forth in claim 1 wherein it has a sealing edge.

3. A bearing device as set forth in claim 1 wherein the control element is a turbulence flap.

4. A bearing device as set forth in claim 1 wherein the control element is a length switching flap.

5. A bearing device as set forth in claim 1 wherein the bearing receiving means and the connecting element are made in one piece.

6. A bearing device as set forth in claim 5 wherein it has a sealing edge.

7. A bearing device as set forth in claim 5 wherein said bearing unit has an inside wall and the inside wall of the bearing unit has a flow wall extending inclinedly relative to the direction of flow of the media flowing therethrough.

8. A bearing device as set forth in claim 7 wherein it has a sealing edge.

* * * * *